Patented June 1, 1948

2,442,710

UNITED STATES PATENT OFFICE 2,442,710

METHINE DYESTUFFS

Oskar Riester, Dessau-Ziebigk, Germany, assignor, by mesne assignments, to General Aniline & Film Corporation, New York, N. Y., a corporation of Delaware No Drawing. Application October 28, 1938, Serial No. 237,474. In Germany November 8, 1937

2 Claims. (Cl. 260—240)

My present invention relates to new methine-dyestuffs.

Dyestuffs are known which are produced by condensation of aromatic bases containing nitrogen with bodies which contain a S—CH$_2$—CO—NR-group (R being hydrogen, alkyl or aryl) such as rhodanine or its N-alkyl-, N-alkylene-, N-aralkyl- or N-aryl-substitution product. The parent materials for the above mentioned process are obtained for example by condensation of rhodanine with an ω-aldehyde of the general formula

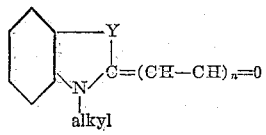

wherein
$n=1$, 2 or 3, and
Y=S, Se, —CH=CH— or

(see British Patents Nos. 438,278, 466,244 and 466,245). Instead of the aldehyde, a ketone of the general formula

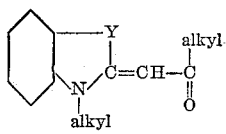

(see British Patent No. 466,097) may be used.

There may further be used for condensation with the rhodanine, derivatives of the aldehydes and ketones such as the oximes or phenylhydrazones, semicarbazides, thiosemicarbazides and the like.

Similar dyestuffs are obtained if a body having the general formula

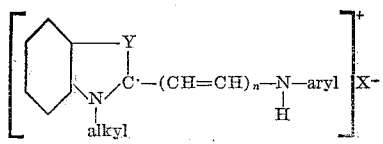

wherein
$n=1$, 2 or 3,
X stands for an acid radicle and
Y stands for S, O, Se, —CH=CH— or

is used for the condensation.

Moreover, the condensation may be carried out by the synthesis of British Patent No. 412,309, according to which a body of the general formula

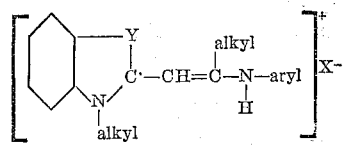

is condensed with rhodanine. Dyestuffs without CH-bridges are obtained by the condensation of rhodanine with thiothiazolonium salts or their isomers of the general formula

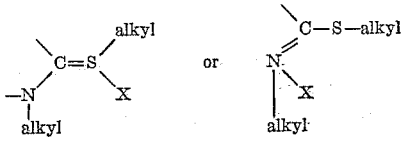

wherein X stands for an acid radicle (see British Patents Nos. 423,792 and 438,420).

Other bases may also be used for the synthesis of this intermediate dyestuff, for example a dialkylaminobenzaldehyde which comes within the general formula

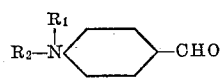

wherein $R_1$ and $R_2$ are akyl, and $R_2$ may join the benzene nucleus to form a ring. There may also be used aldehyde bases of the formula

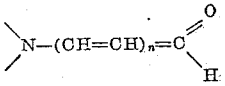

wherein $n=0$, 1, 2 or 3 and the nitrogen atom may be in a heterocyclic ring.

All these dyestuffs can be condensed by the process of U. S. application Serial No. 233,205, applied for by me on October 4, 1938, and entitled "Basic methine dyestuffs," now abandoned, with alkyl-acid radicles, for example alkyl halides or sulfates, to give dyestuffs more soluble in water.

It is one object of my present invention to provide a process of reacting further the aforementioned dyestuffs when condensed with alkyl-acid radicles, and having an active thioalkyl group with quaternary salts of substitued or non-substituted heterocyclic bases which have a reactive $CH_3$-group, in the presence of a condensing agent, for example pyridine or triethylamine in propanol at normal or raised temperatures. The thioalkyl group splits off, with formation of a mercaptan, its place being taken by a methine group derived from the reactive $CH_3$-group.

Another object of the invention is the provision of the new methine dyestuffs produced by said process.

Further objects will be apparent from the following detailed description.

The reaction in the said process occurs as follows:

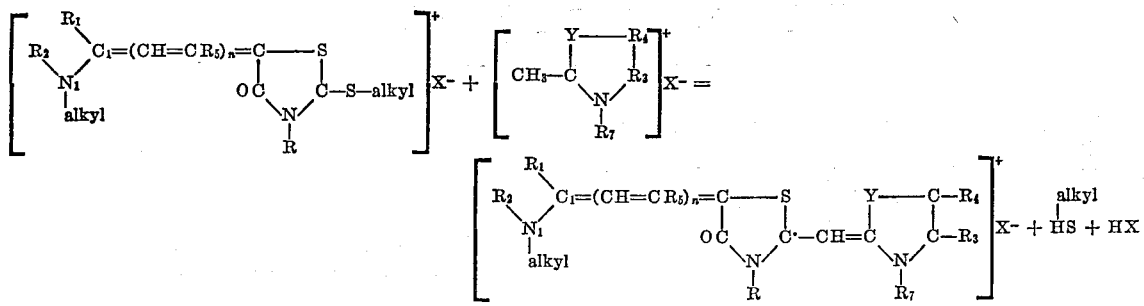

In this equation
Y stands for O, S, Se, —CH=CH—

N-alkyl or N-aryl;
R stands for H, alkyl, aryl, alkylene or aralkyl,
(1) $R_1$ stands for O, S, Se, —CH=CH— or

and forms with $R_2$ a heterocyclic ring in which $R_2$ is —$CH_2$—$CH_2$— (see, for instance, Example 1),
$n=0, 1, 2$ or $3$, or
(2) $R_1$ stands for H,
$R_2$ stands for arylene, which is in a ring with the alkyl group (see, for instance, Example 14),
$n=0, 1, 2$ or $3$, or
(3) $R_1$ stands for H,
$R_2$ stands for alkyl or aryl, there being a benzene nucleus in 1.4-position between the nitrogen atom $N_1$ and the carbon $C_1$, (see, for instance, Example 12), and $N_1R_2$ may be in a ring with the alkyl group (see, for instance, Example 13),
$n= 0, 1, 2$ or $3$.

In all cases $R_3$ and $R_4$ stand for H, $H_2$, the same or a different alkyl, aralkyl or aryl and $R_3$ and $R_4$ together form a phenylene or a substitution product thereof or $\alpha$-naphthylene, $\beta$-naphthylene or $\beta\beta'$-naphthylene, $R_5$ stands for H or alkyl, and $R_7$ stands for alkyl.

Dyestuffs in class (1) have the following general formula

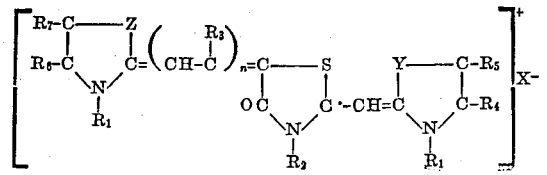

wherein
$R_1$ stands for the same or various alkyls,
$R_2$ stands for H, alkyl, alkylene, aralkyl or aryl,
$R_3$ stands for H or the same or various alkyls containing up to 5 carbon atoms,
$R_4$, $R_5$, $R_6$ and $R_7$ stands for H, $H_2$ or the same or different alkyl, aralkyl or aryl and $R_4$ and $R_5$ and $R_6$ and $R_7$ respectively together form phenylene or a substitution product thereof or $\alpha$-, $\beta$- or $\beta\beta'$-naphthylene,
Y and Z, which may be the same or different, stand for O, S, Se,

—CH=CH—, N-alkyl or N-aryl,

X stands for halogen, alkyl sulfate, toluene sulfonate, perchlorate or another desired acid radicle, and
$n=0, 1, 2$ or $3$.

The new dyestuffs dye substantially more deeply than the corresponding rhodanine or trimethine dyestuffs from the same heterocyclic bases, and give beautiful clear tones. While, for instance, the Thiazole Purple (3.3'-dimethylbenzthiazole trimethinecyanine iodide) is carmine red, the dyestuff, which also contains rhodanine as a third ring, is actually blue. By the new synthesis dyestuffs can be obtained throughout the whole spectrum. Moreover, these dyestuffs are excellently suited for the optical sensitization of photographic silver halide emulsions.

The invention is illustrated by the following examples:

*Example 1.*—The dyestuff obtained from thiazoline aldehyde and N-ethylrhodanine combined with dimethyl sulfate:

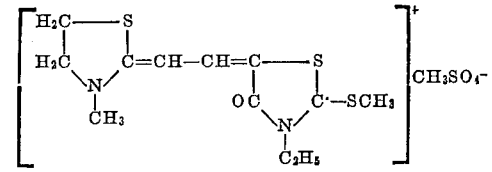

gives, with 2-methyl-4.5-naphtholthiazole ethyl iodide and triethylamine in propanol, a red dyestuff having the formula:

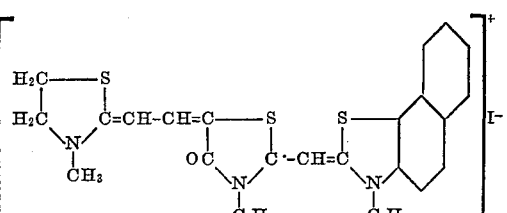

Its absorption maximum is 562 m$\mu$.

*Example 2.*—The dyestuff from ethylrhodanine and 1.1.3-trimethylindoline - 2-methine-$\omega$-aldehyde combined with diethyl sulfate gives, with 2-methyl-benzthiazole ethyl iodide in pyridine a violet dyestuff of the following constitution:

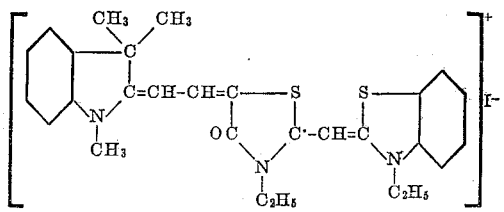

*Example 3.*—The dyestuff from rhodanine and 1.1.3-trimethyl-6-methoxyindoline -2-methine-ω-aldehyde combined with dimethyl sulfate can be condensed with 2-methyl-benzselenazole ethyl iodide in isoquinoline to a blue dyestuff:

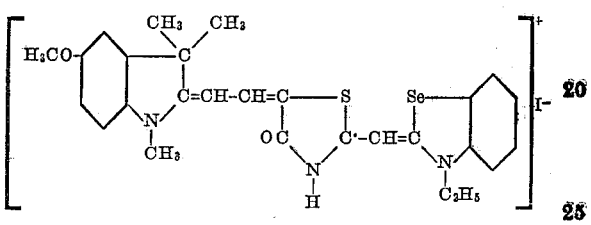

*Example 4.*—The condensation product from N-ethylbenzthiazole-2-methine-ω-aldehyde and N-ethylrhodanine and dimethyl sulfate is caused to react with 4.5-diphenyl-2-methyl-N-ethyl-thiazolium bromide to give a greenish blue dyestuff:

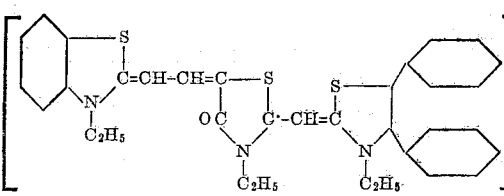

*Example 5.*—The condensation product from the intermediate product of 6-diethylamino-3-ethylbenzthiazolediphenyl-formamidine and N-allylrhodanine, combined with dimethyl sulfate, may be further condensed with 2-methyl-6.7-naphthothiazole ethyl iodide to give a blue-green dyestuff:

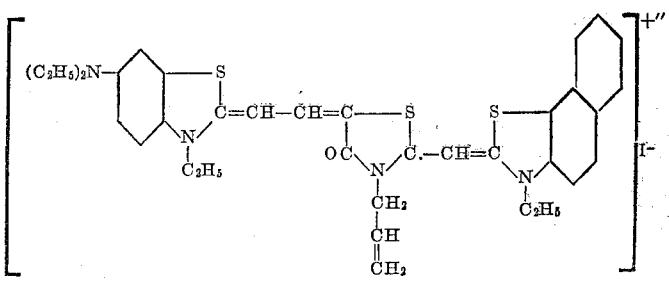

*Example 6.*—The dyestuff from N-ethylbenzthiazole-2-methine-ω-aldehyde and ethylrhodanine, combined with dimethyl sulfate, is caused to react with lepidine dimethyl sulfate to give a green dyestuff:

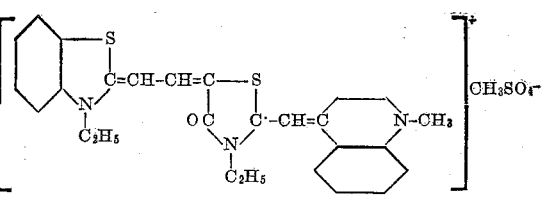

*Example 7.*—The dyestuff from N-methyl-benzthiazole-2-methine-ω-aldehyde and rhodanine combined with dimethyl sulfate, is caused to react with 2-methyl-6.7-naphtho-oxazole ethyl iodide to give a red dyestuff:

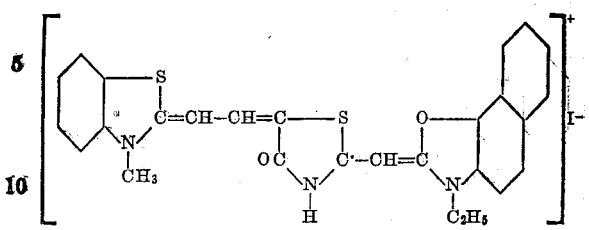

*Example 8.*—The dyestuff from 5-methyl-2-methothiobenzoxazole dimethyl sulfate and allylrhodanine, having the formula

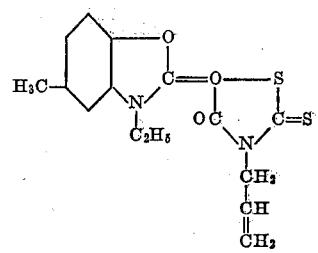

is condensed with dimethyl sulfate, and is further treated in pyridine with 1 mol of 2.5-dimethyl-benzoxazole ethyl iodide for half an hour at 90° C. The yellow dyestuff produced has the following formula:

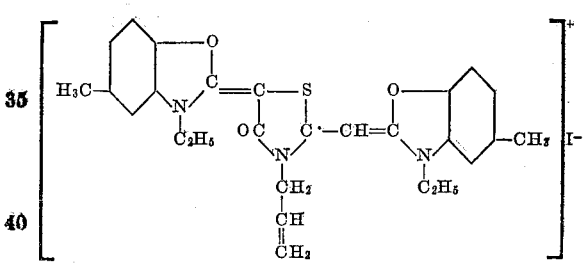

and its absorption maximum is 475 mμ.

*Example 9.*—The dyestuff from 2-methothio-benzthiazole ethyl sulfate and N-ethylrhodanine is condensed with dimethyl sulfate, and further treated in pyridine with 1 mol of 2-methyl-6.7-naphtho-thiazole ethyl - para - toluene-sulfonate for half an hour at 90° C. The orange-red dyestuff produced has the following formula:

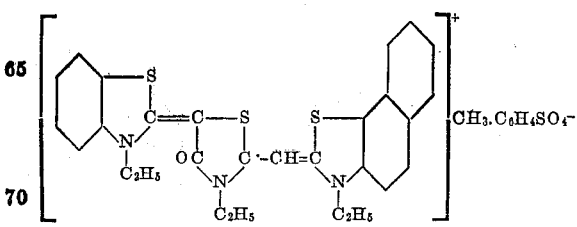

and an absorption maximum of 510 mμ.

*Example 10.*—The dyestuff from 2-methothio-benzthiazole ethyl sulfate and N-ethylrhodanine and dimethyl-sulfate is further treated with 1 mol of 2-methyl-4.5-diphenyl-oxazole diethyl sulfate. The deep yellow dyestuff produced has the following formula:

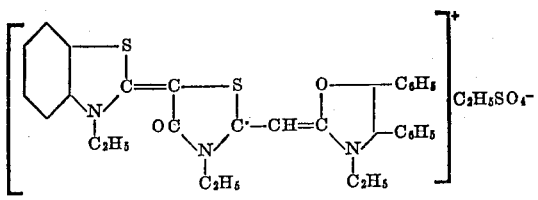

and an absorption maximum of 580 mμ.

*Example 11.*—The dyestuff from N-ethyl-2-(γ-phenyliminopropene)-benzthiazole iodide (synthesized as in British Patent No. 412,309) and N-ethylrhodanine:

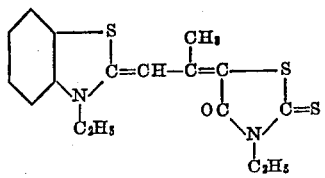

condensed with diethyl sulfate is caused to react in pyridine with methylbenzthiazole ethyl-para-toluene sulfonate at 70° C. for 2 hours and is precipitated with KI-solution. A blue dyestuff having the following formula is produced:

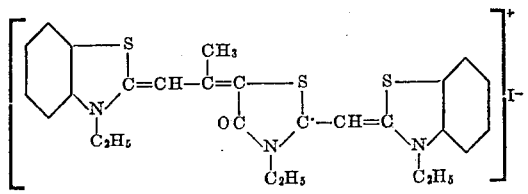

Its absorption maximum is 596 mμ.

*Example 12.*—The orange-yellow dyestuff from para-dimethylaminobenzaldehyde and N-phenylrhodanine is condensed with diethyl sulfate and caused to react in pyridine with 2-methyl-6.7-naphthiazole ethyl iodide. The red-violet dyestuff produced has the following forrmula

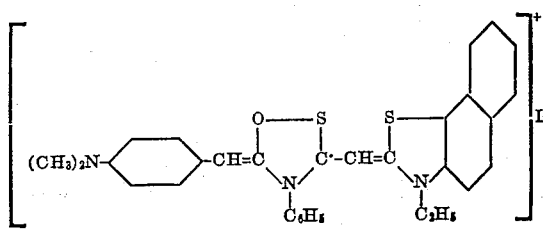

and an absorption maximum of 545 mμ.

*Example 13.*—The dyestuff from N-ethyl-2-methyl-indoline-5-aldehyde and ethylrhodanine and dimethyl sulfate is further condensed with 2-methylbenzthiazole ethyl iodide. The blue-violet dyestuff has the following formula:

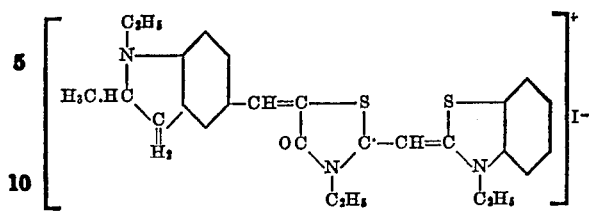

*Example 14.*—The dyestuff from tetrahydroquinoline-N-propenal and N-allylrhodanine and dimethyl sulfate is further condensed with 2-methyl-benzthiazole ethyl iodide in pyridine to a violet dyestuff having the following constitution:

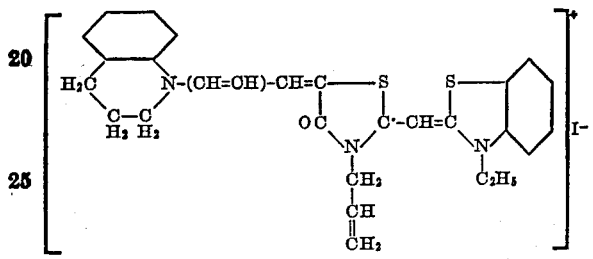

and an absorption maximum of 547 mμ.

*Example 15.*—$^1/_{100}$ mol of N-ethyl-5-(1-ethyl-2-benzthiazolino-butadienyl-) rhodanine (see British Patent No. 450,958, Example 118) is heated with $^3/_{100}$ mols of dimethylsulfate in an oil bath to 115° for about 15 minutes, precipitated by ethyl ether after cooling, dried and condensed in pyridine (about $^{10}/_{100}$ mols) with $^2/_{100}$ mols of 2.5.6-trimethylbenzoxazole ethyl-p-toluene sulfonate at 100° for one hour. The green dyestuff obtained is precipitated by an aqueous potassium iodide solution and recrystallized from methanol; it has the following formula:

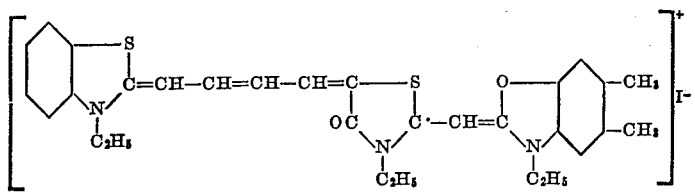

*Example 16.*—The dyestuff intermediate product obtained as described in Example 15 and having the formula

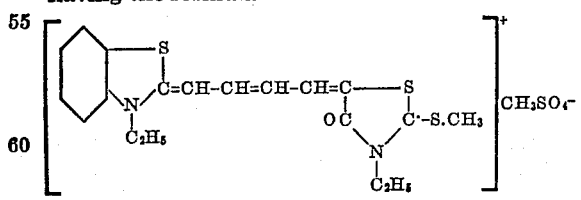

is condensed with 2-methyl-4-phenylthiazole-diethylsulfate in pyridine at 105° for four hours and precipitated as an iodide. The green dyestuff produced has the following formula

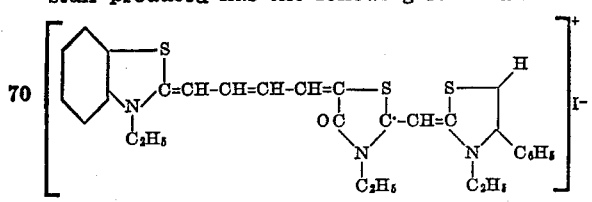

The absorption maximum is at 570 mμ.

I claim:
1. A process which comprises condensing N-ethylbenzthiazole - 2 - monomethine-ω-aldehyde with N-ethylrhodanine and dimethyl sulfate, reacting the condensation product thus produced with 4,5-diphenyl-2-methyl-N-ethylthiazolium bromide in the presence of an alkaline condensing agent.

2. A dye having the following formula:

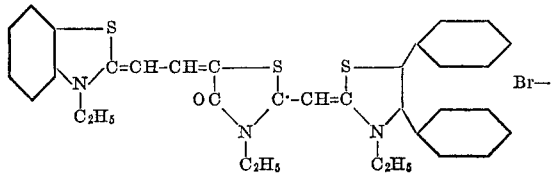

OSKAR RIESTER.

REFERENCES CITED

The following references are of record in the file of this patent:

UNITED STATES PATENTS

| Number | Name | Date |
| --- | --- | --- |
| 1,973,462 | Brooker | Sept. 11, 1934 |
| 2,060,383 | Schneider | Nov. 10, 1936 |
| 2,148,441 | Dawson | Feb. 28, 1939 |

FOREIGN PATENTS

| Number | Country | Date |
| --- | --- | --- |
| 466,097 | Great Britain | May 18, 1937 |
| 466,244 | Great Britain | May 18, 1937 |